C. G. GERLACH.
EMERGENCY AUTOMOBILE TIRE.
APPLICATION FILED JAN. 22, 1920.

1,385,612.

Patented July 26, 1921.

Charles G. Gerlach
INVENTOR

BY
Simon P. Dorner
ATTORNEY

UNITED STATES PATENT OFFICE.

CHARLES G. GERLACH, OF SPOKANE, WASHINGTON.

EMERGENCY AUTOMOBILE-TIRE.

1,385,612.   Specification of Letters Patent.   Patented July 26, 1921.

Application filed January 22, 1920. Serial No. 353,376.

*To all whom it may concern:*

Be it known that I, CHARLES G. GERLACH, a citizen of the United States, and a resident of Spokane, in the county of Spokane and State of Washington, have invented a new and useful Improvement in Emergency Automobile-Tires, of which the following is a specification.

My invention relates to automobile tires and particularly to jointed tires formed wholly or partially of wood or similar material and adapted to be applied to the rim of an automobile wheel in the place of the usual rubber tire in the event of a tire blowout or other accident of like nature.

The objects of my invention are the provision of an effective, convenient and economical tire for use in an emergency, which may be easily and quickly applied to the wheel rim of an automobile or truck and as readily removed therefrom; which may with facility be adjusted to fit any size automobile or truck wheel; and by means of which the automobile or truck may be used for power purposes to drive machinery, through the agency of a belt passed over one of its rear wheels fitted with my improved tire.

Figure 1:
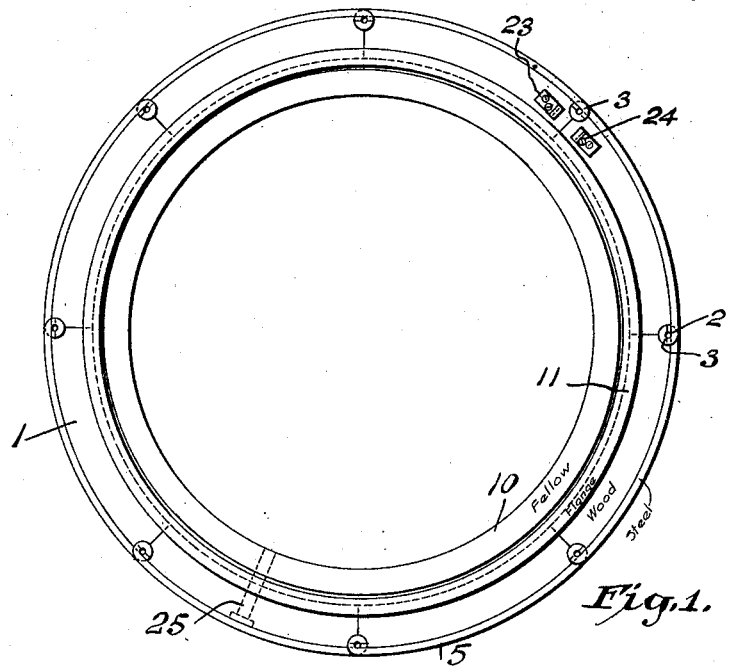
Figure 3:
Figure 4:
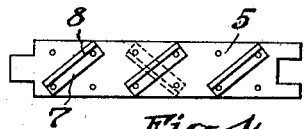
Figure 2:
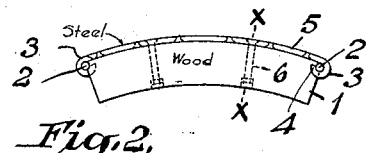
Figure 5:
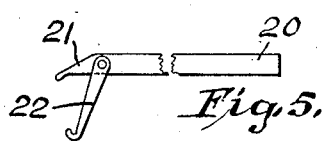

In the drawings, Figure 1 is a side elevational view of my invention applied to a wheel; Fig. 2 is a side elevational view of one section of the tire; Fig. 3 is a transverse sectional view on line X—X of Fig. 2; Fig. 4 is a plan view of a modified form of armor for the section illustrated in Figs. 2 and 3; and Fig. 5 is a detail view of a tightening lever adapted to be used in connection with the tightening hooks illustrated in Fig. 1.

My emergency tire consists of a plurality of arcuate sections of wood or other suitable material which is both light and durable, each section being adapted to be pivotally connected at either end to other similar sections to form, when in position, a continuous annular member of a size and shape to fit a wheel rim 11, the tire fitting snugly between the flanges of the rim and being held against transverse movement thereby. The substance of which the tire sections are made may be waterproofed by being treated with linseed oil or other suitable waterproofing material.

The pivotal connection of the sections is effected by means of bolts or pintles 2 passed through overlapping eyes 3 of adjacent sections. These eyes are preferably formed of metal and are slightly open at one side, the spacing of the end 4 away from the adjacent portion of the eye furnishing a means whereby a small amount of slack which may develop between the tire sections may be taken up, through the tightening or closure of the eyes 3.

The sections 1 may be used unarmored, but I prefer to provide the outer surface of each section with a relatively thin plate of steel or other suitable metal 5, securing the same to the sections 1 by bolts 6 or any other suitable or convenient means.

In the preferred embodiment of my invention the plate 5 is formed with integral loops at its ends, the ends of the wood sections 1 being slightly cut away at their outer edges to accommodate the loops on the ends of plates 5. These loops act as the eyes 3 for the reception of the bolts or pintles 2. A convenient arrangement of the abutting loops of adjacent plates is that shown in Fig. 4, wherein the plate 5 has a single centrally-positioned loop at one end and a pair of spaced loops at the other end, the single loop of each plate being designed to fit between the spaced loops of the next adjacent plate and to be retained in pivotal connection therewith by pintle 2. Thus the armor plate of each section 1 and the members carried by that particular section and by which it is pivotally connected to the next adjacent sections are rigidly connected, and the assembled structure presents a continuous smooth band of metal about the outer periphery of the tire, the parts of the band being firmly connected to the tire sections 1 and to each other.

The positioning of the pivot joints between the sections 1 at or near the outer periphery of the tire sections 1 makes for a stronger and more durable construction, as well as a structure that is more simple and adaptable from the manufacturing standpoint, than would be the case were the joints at the inside periphery of the tire or at some point substantially midway between the inner and outer peripheries. Moreover, when the tire is in position, the connected metal loops of adjacent plates 5 overlie and protect the outer peripheral edges of the wooden tire sections 1 and not only prevent the chipping or wearing of the latter's edges when in use, but also provide a closer joint between the sections and thus render impossible the working of stones, gravel or other rough particles into the joint between adjoining ends of the wood sections 1.

The length of the tire sections may be varied to accord with the size of wheel upon which they are to be applied. For standard sizes of wheels the sections may be made of uniform length and interchangeable. Or the sections may be of different lengths, in which case by a proper selection of the correct lengths of sections, the tire may be changed at will from one that is adapted to a large size wheel to one for a smaller wheel, or vice versa. When the tire is not needed or is not in use it may be taken apart and the sections kept in the tool chest of the automobile or truck.

The smooth tread tire such as is shown in Figs. 1, 2 and 3, can be used as a pulley on a rear wheel of any motor car for running machinery, such as band saws, concrete mixers, washing machines, water pumps, etc.

For use as an emergency tire, and especially in winter or upon roads that are very dusty, slippery, or otherwise bad, the armor plate 5 applied to the sections 1 may be provided with a number of metal calks or cleats 7 fastened to its outer surface, as shown in Fig. 4. The calks are shown in the drawing as in the form of angle irons, one side of each angle iron being secured to the plate 5 and the upstanding portion 8 affording a road-gripping member for securing better traction. Other forms or types of calks may be used in the same manner. The calks illustrated in Fig. 4 are arranged in alinement and inclined in the same direction, but any other effective or desired arrangement may be used, such as, for example, the inclination of alternate calks in opposite directions, as indicated in dotted lines in Fig. 4.

To assemble the parts of my emergency tire, the necessary number and lengths of sections 1 to form a tire of the desired interior circumference are joined together by inserting bolts or pintles 2 into adjoining pairs of eyes 3. The tire is then placed on the rim and the ends of the tire brought together and fastened by inserting a bolt or pintle 2 into the meeting pair of eyes 3, in a similar manner. In order to bring the ends of the tire closely together for the purpose of inserting the last bolt 2, I make use of a tightening lever (Fig. 5), consisting of a bar 20 having pivoted clamping jaws 21 and 22 adapted to engage respectively a pair of tightener hooks 23, 24 upon the sides of the abutting ends of the sections 1 at the ends of the tire.

As a means for preventing the tire from turning on the rim after it is in position, a bolt 25 is inserted through one of the sections 1 and the air valve aperture in the rim. On heavy trucks it may be advisable to provide two or more such holding bolts at intervals around the circumference of the tire.

I claim:

1. An emergency tire for motor vehicles comprising a plurality of abutting arcuate sections adapted to be pivotally connected to form a continuous jointed tire, each section being provided with eyes at its ends in its outer peripheral portion, each eye being substantially flush with the end of the tire section and the eyes of abutting sections registering on the meeting line of abutting sections, and means inserted in each of said registering pairs of eyes for pivotally connecting adjacent tire sections.

2. An emergency tire for motor vehicles comprising a plurality of curved tire sections, and hinge joint connections between the abutting ends of adjacent sections, said hinge connections being flush with the outer peripheral surface of the tire sections, whereby the joints between the tire sections are closed at their outer edges and a smooth outer surface provided for the jointed tire.

3. An emergency tire for motor vehicles comprising a plurality of abutting curved tire sections adapted to be pivotally connected to form a continuous jointed tire, each section having upon its outer surface recesses in its ends at its outer peripheral edge, each tire section having upon its outer surface a protective band of metal formed with eyes at its ends seating in the recesses in the ends of the tire section substantially flush with the ends of said tire section, the eyes of abutting sections overlapping, and means inserted in each of said overlapping pairs of eyes for pivotally connecting adjacent tire sections.

4. An emergency tire for motor vehicles comprising a plurality of curved tire sections adapted to be pivotally connected to form a continuous jointed tire, each section having upon its outer peripheral surface a protective band of metal curved at its ends to form eyes, the end of each of said eyes being slightly spaced from the band and adapted to be forced up against said band to shorten said eye and take up slack in the tire, the eyes of abutting sections registering, means for removable insertion in said eyes to hold the tire sections together in jointed relation.

CHARLES G. GERLACH.